United States Patent [19]

Harada et al.

[11] Patent Number: 5,191,444
[45] Date of Patent: Mar. 2, 1993

[54] METHOD OF CONVERTING GRADATION OF A DIGITAL IMAGE AND A CIRCUIT THEREOF AND A PRINT DENSITY CONTROLLING APPARATUS FOR A PRINTER AND A PRINTER USING THIS METHOD

[75] Inventors: Masaki Harada; Hiroshi Kano, both of Hirakata, Japan

[73] Assignee: Sanyo Electric Co., Ltd., Osaka, Japan

[21] Appl. No.: 708,103

[22] Filed: May 28, 1991

Related U.S. Application Data

[63] Continuation of Ser. No. 365,190, Jun. 12, 1989, abandoned.

[30] Foreign Application Priority Data

Jun. 20, 1988 [JP] Japan ................. 63-151768

[51] Int. Cl.$^5$ ............................................. H04N 1/40
[52] U.S. Cl. ................................... 358/455; 358/458
[58] Field of Search ............. 358/455, 456, 457, 458, 358/459, 460, 461, 75, 80, 163, 447, 448

[56] References Cited

U.S. PATENT DOCUMENTS

| | | |
|---|---|---|
| 4,534,059 | 8/1985 | Yamada ..................... 358/461 |
| 4,590,491 | 5/1986 | Hori et al. . |
| 4,695,884 | 9/1987 | Anastassiou et al. ............ 358/163 |
| 4,777,536 | 10/1988 | Kato . |
| 4,829,584 | 5/1989 | Shimano . |
| 4,962,433 | 10/1990 | Matsushima ..................... 358/455 |

FOREIGN PATENT DOCUMENTS

| | | |
|---|---|---|
| 0130149 | of 0000 | European Pat. Off. . |
| 0196044 | of 0000 | European Pat. Off. . |
| 58-165480 | 9/1983 | Japan ..................... 358/455 |
| 60-236575 | 11/1985 | Japan ..................... 358/458 |
| 61-157191 | 7/1986 | Japan . |
| 62-152763 | 7/1987 | Japan . |
| 2127647 | 4/1984 | United Kingdom . |
| 2207023 | 1/1989 | United Kingdom . |
| WO86/05901 | 10/1986 | World Int. Prop. O. . |

OTHER PUBLICATIONS

Gonzalez and Wintz, Image Enhancement, Digital Image Processing, 2nd edition, 1987, pp. 139-153.

Primary Examiner—Stephen Brinich
Assistant Examiner—Thomas D. Lee
Attorney, Agent, or Firm—Darby & Darby

[57] ABSTRACT

A method of converting gradation of a digital image data so as to reduce the number of gradation, a circuit thereof, a print density controlling apparatus for a printer and a printer using the method, in which the number of gradation being converted into one gradation is set smaller for the portion of low gradation of the original data than for the portion of high gradation thereof, so that the gradation of the low-gradation portion is smoothly varied visually in the image after gradation conversion.

9 Claims, 4 Drawing Sheets

Fig. 2

| ADDRESS | DATA |
|---|---|
| 0 | 255 |
| 1 | 56 |
| 2 | 11 |
| 3 | 12 |
| 4 | 19 |
| 5 | 19 |
| 6 | 19 |
| 7 | 19 |
| 8 | 19 |
| 9 | 19 |
| 10 | 19 |
| ... | ... |
| 61 | 27 |
| 62 | 29 |
| 63 | 29 |

Fig. 3

ORIGINAL DATA

| | |
|---|---|
| (0) | 0 |
| (1) | 1 |
| (2) | 2 |
| (3) | 3 |
| (4) | 4 |
| (5) | 5 |
| (6) | 5 |
| (7) | 6 |
| (8) | 6 |
| (9) | 7 |
| (10) | 7 |
| (11) | 8 |
| (12) | 8 |
| (13) | 9 |
| (14) | 9 |
| (15) | 10 |
| (16) | 10 |
| ... | ... |
| (243) | 62 |
| (244) | 62 |
| (245) | 62 |
| (246) | 62 |
| (247) | 62 |
| (248) | 63 |
| (249) | 63 |
| (250) | 63 |
| (251) | 63 |
| (252) | 63 |
| (253) | 63 |
| (254) | 63 |
| (255) | 63 |

METHOD OF CONVERTING GRADATION OF A DIGITAL IMAGE AND A CIRCUIT THEREOF AND A PRINT DENSITY CONTROLLING APPARATUS FOR A PRINTER AND A PRINTER USING THIS METHOD

This is a continuation of application Ser. No. 365,190, filed Jun. 12, 1989, abandoned.

BACKGROUND OF THE INVENTION

1. Field of the Invention

The present invention relates to a method of converting gradation of a digital image and a circuit thereof and a print density controlling apparatus for a printer and a printer using this method.

2. Description of Related Art

In the case where a digital image having gradation is displayed on a display unit or printed by a printer, it is sometimes required that the number of gradation of an original image data is converted into a smaller number of gradation, for example, 256 gradation (8-bit data) are converted into 64 gradation (6-bit data). In such a case, conventionally, the method of simply converting four gradation of an original image data into one gradation has been generally used. This means that data processing has only to be performed simply in a manner that the low-order two bits of the 8-bit gradation data of the original image are neglected.

Table 1 shows a relationship of gradation conversion in this case.

TABLE 1

| Gradation order of original data | 1,2, 3,4, | 5,6, 7,8, | 9,10, 11,12, | ... | 253,254, 255,256 |
|---|---|---|---|---|---|
| Gradation order of converted data | 1 | 2 | 3 | ... | 64 |

On the other hand, in the printer of the type that thermal transfer onto print paper is performed by sublimating ink, the invention of the Japanese Patent Application Laid-Open No. 62-152,763 has been proposed as a technique for making an accurate gradation expression of an image data.

This invention adopts a configuration of controlling the pulse width of energizing to a heat generating element in response to gradation data of each picture element. This means that the relationship between the energy applied to the thermal head and the print density in monochrome is obtained for three primary colors respectively; yellow, magenta and cyan, and the applied energy for the density-scale of each color is controlled from this result.

However, in the case where a digital image data is printed by applying a simple gradation converting method as described above to a printer having such a configuration, a problem takes place that the gradation of the low-gradation part, that is, the light colored portion is visually rough. This is caused by the nature that the human eyes sense the difference in color density more sensitively for the light-color portion than for the deep colored portion (high gradation part).

SUMMARY OF THE INVENTION

The present invention has been achieved in the light of such circumstances, and a primary object thereof is to provide a method of converting gradation of a digital image and a circuit thereof and a print density controlling apparatus for a printer and a printer using this method whereby the gradation smoothly varies visually from the light colored portion (low gradation part) to the deep colored portion (high gradation part) int he case where the number of gradation of the digital image is converted into a smaller number of gradation.

In a method of converting gradation of a digital image in accordance with the present invention, in converting gradation of an image data so as to reduce the number of gradation, the number of gradation of an original image data to be put in the same gradation is set smaller for the low gradation portion of the original image data than for the high gradation portion thereof. Thereby, in the image after gradation conversion, the gradation of the low gradation portion smoothly varies visually.

The above and further objects and features of the invention will more fully be apparent from the following detailed description with accompanying drawings.

BRIEF DESCRIPTION OF THE DRAWINGS

FIG. 2 is a schematic diagram showing the data contents of a gradation control table thereof.

FIG. 3 is a schematic diagram showing the data contents of a conversion table of the same.

DESCRIPTION OF THE PREFERRED EMBODIMENTS

Figure 1:
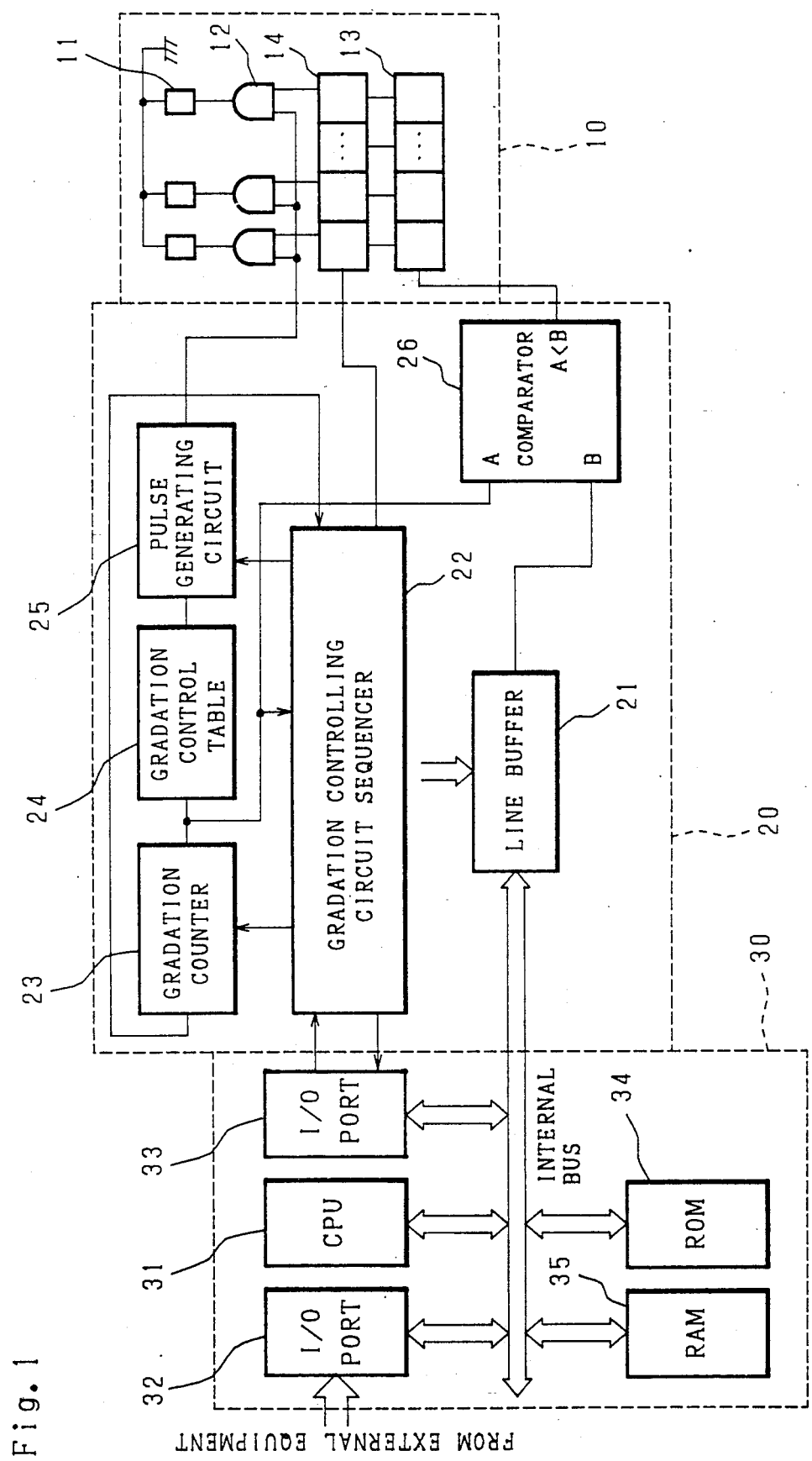
FIG. 1 is a block diagram showing a configuration of a print density controlling apparatus for a printer using a circuit of converting gradation of a digital image in accordance with the present invention.

Hereinafter, detailed description is made on the present invention on the basis of drawings showing embodiments thereof.

The case of converting an original data of 256 gradation (8-bit data) into 64 gradation (6-bit data) is described as an example.

First, the range of gradation after conversion is divided into four groups of a first highlight part, a second highlight part, a medium part and a shadow part in a sequence from a low density (low gradation part). Then, an original data of 256 gradation is made to correspond to the above-described four groups, and in this case, the number of gradation of the original data to be converted into one gradation is set differently group by group. Hereinafter description is made on this point.

In the first highlight part, one gradation of a converted data is made to correspond to one gradation of the original data in a ratio of 1:1, thereby comprising four gradation of the original data from the first gradation to the fourth gradation.

In the second highlight part, one gradation of the converted data is made to correspond to two gradation to the original data, thereby comprising from the fifth gradation to the 44th gradation of the original data.

In the medium part, one gradation of the converted data is made to correspond to four gradation of the original data, thereby comprising from the 45th gradation to the 152-nd gradation of the original data.

In the shadow part, one gradation of the converted data is made to correspond to eight gradation of the original data, thereby comprising from the 153rd gradation to the 256th gradation of the original data.

Table 2 shows a relationship of order of gradation between an original data and that converted data. Table 3 shows the density range in each group of each color and the range of order of gradation of the original data corresponding to order of gradation of that converted data.

TABLE 2

| Order of gradation of original data | 1 | 2 | 3 | 4 | 5, 6, | 7, 8, | 45–48 | 49–52 | 153–160 | 249–256 |
|---|---|---|---|---|---|---|---|---|---|---|
| Order of gradation of converted data | 1 | 2 | 3 | 4 | 5 | 6 | 12 | 13 | 52 | 64 |

(To be continued)

TABLE 3

| | Density range | | | Number of gradation of original data | Range of gradation of original data |
|---|---|---|---|---|---|
| | Yellow | Magenta | Cyan | | |
| First highlight part | 0.11–0.14 | 0.08–0.11 | 0.06–0.09 | 1 | 1–4 |
| Second highlight part | 0.14–0.48 | 0.11–0.38 | 0.09–0.38 | 2 | 5–44 |
| Medium part | 0.48–1.36 | 0.38–1.10 | 0.38–1.15 | 4 | 45–152 |
| Shadow part | 1.36–2.25 | 1.10–1.80 | 1.15–1.90 | 8 | 153–256 |

Thus, when the original data of 256 gradation is converted into a data of 64 gradation according to Table 2 and Table 3, and for example, printed by a printer, the highlight parts have a smooth gradation visually. On the other hand, the shadow part has a gradation rougher than the original data, but can hardly discerned visually. Accordingly, when the original data of 256 gradation is converted into 64 gradation and printed by the above-described method, an image quality equivalent visually to 256 gradation is obtainable.

Next, description is made on a gradation converting circuit using the above-mentioned method of the present invention and a print density controlling apparatus of a printer and a printer which use this circuit in reference to drawings.

FIG. 1 is a block diagram showing a configuration of a gradation converting circuit of the present invention and a print density controlling apparatus for a printer using this circuit.

In FIG. 1, a thermal head 10 is constituted with a large number of heat generating members 11 and driver circuits 12, shift registers 13, latch circuits 14 and the like for each of them. The shift register 13 stores serial output data given from a comparator 26 as described later, and outputs them as parallel data. The latch circuit 14 latches the parallel data given from the shift register 13 temporarily, and gives them to each driver circuit 12.

A gradation controlling circuit 20 is constituted with a line buffer 21, a gradation controlling circuit sequencer 22, a gradation counter 23, a gradation control table 24, a pulse generating circuit 25, the above-described comparator 26 and the like.

In this gradation controlling circuit 20, density information of one line of an image stored in the line buffer 21, that is, data of gradation (6 bits in this embodiment) is converted into energizing operation of 63 times to the thermal head 10, and thereby expression of density of 64 gradation is made possible.

The gradation counter 23 is cleared temporarily to "0" in starting print of one line, and is counted up every time an energizing pulse corresponding to each gradation is applied, and indicates the order of gradation corresponding to a pulse to be applied next.

The gradation control table 24 is a memory storing data of the length of the energizing pulse to be applied to the thermal head 10 for each gradation. The detailed data contents thereof are as shown in FIG. 2.

In FIG. 2, a value "1" of "data" shows a pulse duration of 16 μsec. Accordingly, this means that to print the density of a first gradation, a pulse of a time width of $$255 \times 16 \ \mu sec = 4.08 \ msec$$

has only to be applied.

Also, this means that to print the density of a second gradation, an additional time width of $$56 \times 16 \ \mu sec = 896 \ \mu sec$$

is required, and to print the density of a third gradation, a further additional time width of $$11 \times 16 \ \mu sec = 176 \ \mu sec$$

is required.

The pulse generating circuit 25 generates a single-shot pulse of a length corresponding to the data outputted from the gradation control table 24 in synchronism with a signal applied to another terminal (not illustrated).

The line buffer 21 stores density information of one line.

The comparator 26 compares the density information on each dot outputted from the line buffer 21, that is, the data representing the gradation with the gradation level to be printed at present, and converts it into a binary data representing whether or not the next gradation level is to be printed.

The gradation controlling circuit 22 is a controller controlling timing of operation of each of the above-described constituents.

A gradation data conversion controlling circuit 30 is constituted with a CPU 31 directing start of operation and monitoring end of the operation of the gradation controlling circuit sequencer 22, I/O ports 32 and 33, a ROM 34 storing a table as shown in FIG. 3 corresponding to the program of the CPU 31 and the method of the present invention as described above, a RAM 35 and the like.

This gradation data conversion controlling circuit 30 receives an image data having density information of 256 gradation (8-bit data) from an external equipment such as a computer system, converts it into a data of 64 gradation (6-bit data), and transfers it to the line buffer 21 of the gradation controlling circuit 20.

Next, description is made on a gradation converting circuit and a print density controlling apparatus for a printer of the present invention on the basis of the gradation controlling circuit 20 and control procedures of the CPU 31.

Figure 4:
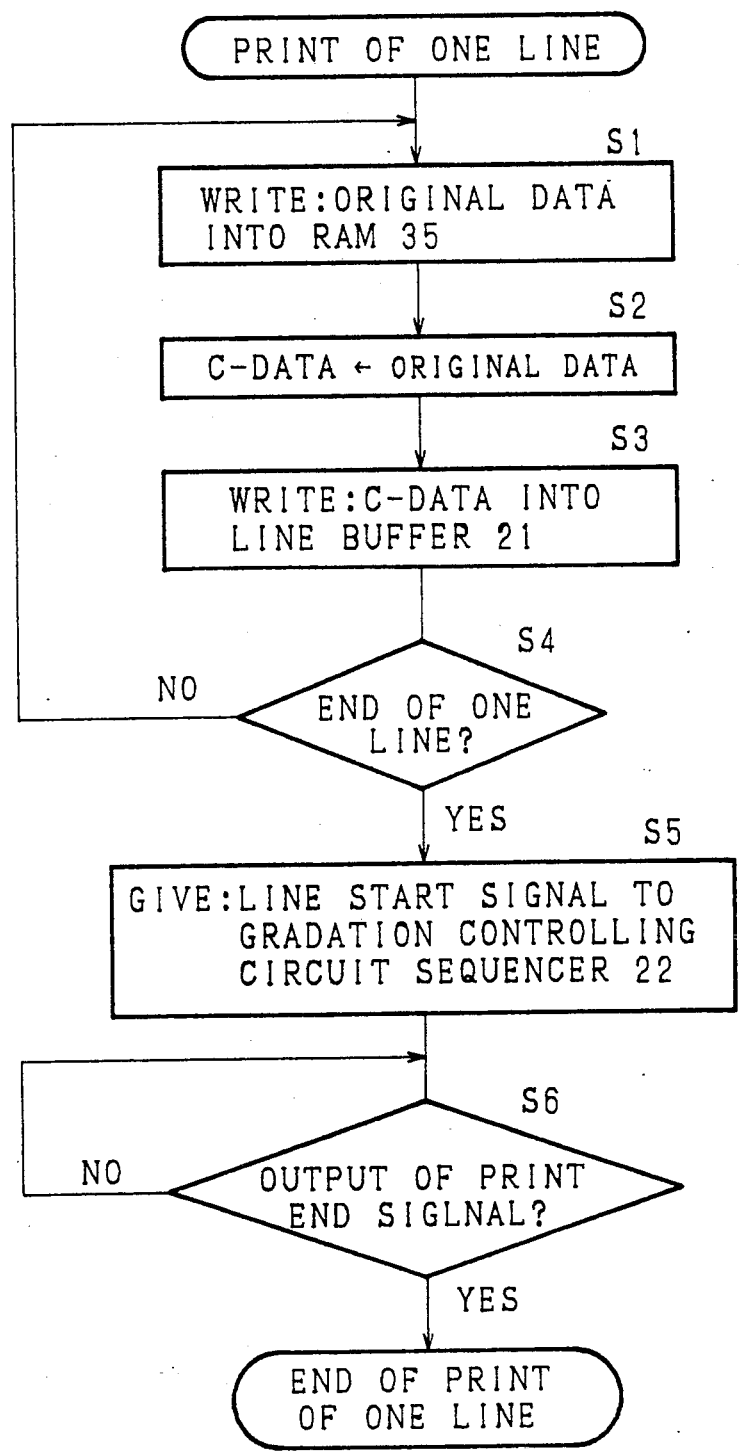
FIG. 4 is a flowchart showing controlling procedures of a CPU.

FIG. 4 is a flowchart showing operation procedure of the CPU 31.

First, the CPU 31 writes into the RAM 35 an original data inputted from an external computer system or the like through the I/O port 32 (step S1). Then, the conversion table from 256 gradation to 64 gradation as shown in FIG. 3 is stored in the ROM 34. The CPU 31 sequentially reads the original data from the RAM 35, converts it into a data of 64 gradation (hereinafter referred to as C-DATA) according to the table stored in the ROM 34 (step S2), and writes it to the line buffer 21 of teh gradation controlling circuit 20 (step S3). The CPU 31 repeats the above steps for one line until it is completed (step S4), and thereafter gives a line print start signal to the gradation controlling circuit sequencer 22 (step S5). Thereby, as described above, print of one line is executed by the gradation controlling circuit sequencer 22. On completing this one-line print, the gradation controlling circuit sequencer 22 gives a line print end signal to the CPU 31, and therefore, when this line print end signal is inputted, the CPU 31 terminates processing of one line (step S6).

Figure 5:
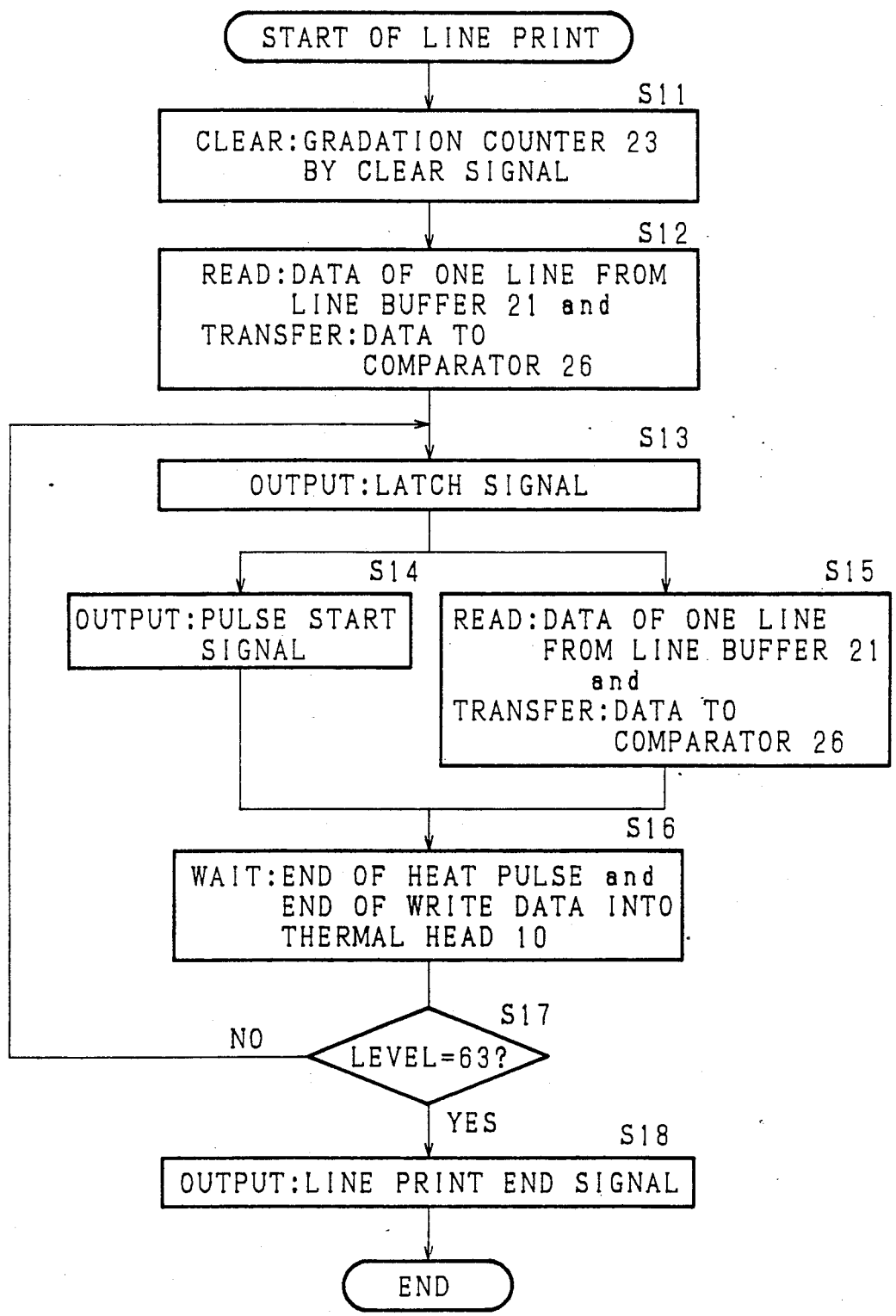
FIG. 5 is a flowchart showing controlling procedures of a gradation controlling circuit sequencer.

FIG. 5 is a flowchart of the gradation controlling circuit sequencer 22 of the gradation controlling circuit 20.

First, on receiving the line print start signal directing start of one-line print from the CPU 31 as described above, the gradation controlling circuit sequencer 22 clears the gradation counter 23 (step S11). Subsequently, the gradation controlling circuit sequencer 22 reads data of one line from the line buffer 21, sequentially transfers it to the comparator 26, so that information that each dot as a result of processing by this comparator 26 to print/not-print in the gradation at that point of time is written into the shift register 13 of the thermal head 10 (step S12). Thereafter, the gradation controlling circuit sequencer 22 outputs a latch signal to the latch circuit 14, and makes it latch the content of the shift register 13 (step S13), and thereafter gives a pulse start signal to the latch circuit 14 (step S14). Thereby, a signal representing print/non-print from each latching circuit 14 and a pulse for printing one gradation from the pulse generating circuit 25 are given to the driver circuit 12 of each heat generating member 11, and therefore printing having a density equivalent to one gradation is performed.

The gradation controlling circuit sequencer 22 repeats the above operation 63 times (steps S15, S16, S17, S3 . . . ), and thereby printing of one line is completed. Thereby, as described above, the gradation controlling circuit sequencer 22 gives the line print end signal to the CPU 31.

As described above, in accordance with the present invention, for example, in the case where an original image data of 256 gradation is printed as an image data of 64 gradation, the low-gradation portion is visually recognized to be varied smoothly in gradation, and in reverse, the high-gradation portion becomes rough in gradation, but can be hardly discerned visually. Accordingly, even in the case where the original data is converted into a data of a number of gradation smaller than the number of gradation of the original image data, a high-quality image equivalent to the original image is obtainable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A circuit for converting gradation of a digital image, the circuit converting original image data with m gradation into converted image data with n gradation where m is an integer greater in value than that of n, comprising:

a first storing means for storing original image data of the digital image which has m gradation which includes gradation associated with a high-gradation side and other gradation associated with a low-gradation side, said low-gradation side being indicative of a light-colored portion, said high-gradation side being indicative of a deep-colored portion, wherein a human eye is more sensitive to differences in color density for the light-colored portion than for the deep-colored portion;

means for assigning a number of gradation of conversion data based on the sensitivity of the human eye to color density differences, said assigning means including a conversion table for storing groups of gradation of the conversion data, at least one of the groups being assigned to the high-gradation side, at least another one of the groups being assigned to the low-gradation side, each of the groups being set to have assigned a respective manner of gradations, the respective number of gradation of the at least one group assigned to the low-gradation side being less than the respective number of gradations set for at least another one of the groups assigned to the high-gradation side so that each of the numbers of gradations assigned to each group of both the low-gradation and high-gradation sides is based on the sensitivity of the human eye to color density differences;

an operation means for converting gradation of the original image data with m gradation which is stored in said first storing means into converted image data with n gradation in correspondence with said groups of gradation of conversion data in said conversion table; and a second storing means for storing the converted image data converted by said operation means.

2. A circuit as in claim 1, in combination with a print density controlling apparatus which contains the circuit; further comprising:

a gradation controlling circuit for controlling gradation according to the data stored in said second storing means.

3. A print density controlling apparatus as set forth in claim 2, wherein said operating means converts gradation of the original image data stored in said first storing means one line at a time according to said conversion table.

4. A circuit as in claim 1, in combination with a printer which contains the circuit; further comprising:

a gradation controlling circuit for controlling gradation according to the data in said second storing means.

5. A printer as set forth in claim 4, wherein said operating means converts gradation of the original image data stored in said first storing means one line at a time according to said conversion table.

6. A method of converting gradation of a digital image, comprising the steps of:

representing the digital image as original image date with gradation where m is an integer, the m gradation having a low-gradation side indicative of a light colored portion of the digital image and a high-gradation side indicative of a deep colored portion of the digital image, whereby the human eye is more sensitive to differences in color density of the light colored portion than to differences in color density of the deep colored portion;

assigning respective gradations of the m gradation for conversion into converted data of n gradation where m has a value greater than n and n is an integer;

converting the original image data with m gradation into the converted data of n gradation based on the assigning of the respective gradations;

dividing the n gradation of the converted data into a plurality of groups in accordance with the assigning of the respective gradations so that the converted data has groups corresponding to the high-gradation side and groups corresponding to the low-gradation side; and setting the assigning of the respective gradations based on the sensitivity of the human eye to color density differences, the step of setting including setting a number of gradations of the original image data assigned to each group of the high-gradation side to be greater than a number of gradations of the original image data assigned to each group of the low-gradation side and so that each of the numbers of gradations assigned to each group of both the high-gradation and low gradation sides is based on the sensitivity of the human eye to color density differences;

whereby gradation of the converted data visually appears to vary smoothly from the light-colored portion to the high-colored portion.

7. A method as in claim 6, wherein the step of dividing includes dividing the n gradation into four groups, the steps of assigning including assigning the four groups each with a respective one of the different corresponding number of m gradation of the original image data at n:m ratios of 1:1, 1:2, 1:4 and 1:8, respectively.

8. An apparatus suitable for converting gradation of a digital image, comprising:

means for representing the digital image as original image data with m gradation where m is an integer, the m gradation having a low-gradation side indicative of a light colored portion of the digital image and a high-gradation side indicative of a deep colored portion of the digital image, whereby the human eye is more sensitive to differences in color density of the light colored portion than to differences in color density of the deep colored portion;

means for assigning respective gradation of the m gradation for conversion into converted data of n gradation where m has a value greater than n and n is an integer;

means for converting the original image data with m gradation into the converted data of n gradation based on the assigning of the respective gradations;

means for dividing the n gradation of the converted data into a plurality of groups in accordance with the assigning of the respective gradations so that the converted data has groups corresponding to the high-gradation side and groups corresponding to the low-gradation side; and means for setting a number of the respective gradations based on sensitivity of the human eye to color density differences, said assigning means being responsive to said setting means for assigning the respective gradations so that a number of gradations of the original image data assigned to each group of the high-gradation side is greater than a number of gradations of the original image data assigned to each group of the low-gradation side and so that each of the numbers of gradations assigned to each group of both the high-gradation and low-gradation sides is based on the sensitivity of the human eye to color density differences, whereby gradation of the converted data visually appears to vary smoothly from the light-colored portion to the high-colored portion.

9. A method for converting gradation of a digital image, the circuit converting original image data with m gradation into converted image data with in gradation where m is an integer greater in value than that of n, comprising the steps of:

storing original image data of the digital image which has m gradation that includes gradation associated with a high-gradation side and other gradation associated with a low-gradation side, said low-gradation side being indicative of a light-colored portion, said high-gradation side being indicative of a deep-colored portion, wherein a human eye is more sensitive to differences in color density for the light-colored portion than for the deep-colored portion;

assigning a number of gradation of conversion data based on the sensitivity of the human eye to color density differences, the step of assigning including storing groups of gradation of conversion data in a conversion table, at least one of the groups being assigned to the high-gradation side, at least another one of the groups being assigned to the low-gradation side, each of the groups being set to have assigned a respective number of gradations, the respective number of gradations of the at least one group assigned to the low-gradation side being less than the respective number of gradations set for the at least another one of the groups assigned to the high-gradation side and so that each of the numbers of gradations assigned to each group of both the high-gradation and low-gradation sides is based on the sensitivity of the human eye to color density differences;

converting gradation of the stored original image data with m gradation into converted image data with n gradation in correspondence with said groups of gradation of conversion data in said conversion table; and storing the converted image data converted by the step of converting.

* * * * *